United States Patent
Kodimer

(10) Patent No.: US 10,235,113 B2
(45) Date of Patent: Mar. 19, 2019

(54) SYSTEM AND METHOD FOR MULTIPLE ACCOUNT DOCUMENT PROCESSING COST ACCOUNTING

(71) Applicant: Toshiba TEC Kabushiki Kaisha, Higashigotanda, Shinagawa-ku (JP)

(72) Inventor: Marianne Kodimer, Huntington Beach, CA (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/995,740

(22) Filed: Jun. 1, 2018

(65) Prior Publication Data

US 2018/0357027 A1    Dec. 13, 2018

Related U.S. Application Data

(60) Provisional application No. 62/516,175, filed on Jun. 7, 2017.

(51) Int. Cl.
*G06F 3/12* (2006.01)
*G06Q 30/02* (2012.01)
*G07F 17/26* (2006.01)

(52) U.S. Cl.
CPC .......... *G06F 3/1273* (2013.01); *G06F 3/1253* (2013.01); *G06Q 30/0283* (2013.01); *G07F 17/266* (2013.01); *G06F 2206/1504* (2013.01)

(58) Field of Classification Search
CPC ................. G06F 3/1273; G06F 3/1253; G06F 2206/1504; G06Q 30/0283; G07F 17/266
See application file for complete search history.

(56) References Cited

U.S. PATENT DOCUMENTS

| | | | | |
|---|---|---|---|---|
| 2003/0137690 | A1* | 7/2003 | Hoover | G06F 3/1204 358/1.15 |
| 2004/0034545 | A1* | 2/2004 | Suzuki | G06Q 10/10 705/400 |
| 2008/0189598 | A1* | 8/2008 | Yoshida | G03G 21/02 715/227 |
| 2011/0267647 | A1* | 11/2011 | Kamasuka | G06F 3/1203 358/1.15 |
| 2017/0308874 | A1* | 10/2017 | Park | G06F 3/1203 |

* cited by examiner

*Primary Examiner* — Iriana Cruz
(74) *Attorney, Agent, or Firm* — Ulmer & Berne LLP

(57) ABSTRACT

A system method for multiple account document processing cost accounting includes a multifunction peripheral including an intelligent controller having a processor and memory. A document processing engine operates in conjunction with an instructions issued from the intelligent controller. The intelligent controller receives into memory document processing job data associated with a user. A user interface receives user input identifying the user. The processor calculates a cost for completing a document processing operation with the document processing job data and the calculated cost is displayed. The processor identifies of cost centers associated with an identified user and displays indicia identifying them, along with their associated account values. The processor receives a user selection identifying a selected cost center and completes a document processing operation with the job data and commences a debit from the account value of the selected cost center.

20 Claims, 9 Drawing Sheets

SYSTEM AND METHOD FOR MULTIPLE ACCOUNT DOCUMENT PROCESSING COST ACCOUNTING

CROSS-REFERENCE TO RELATED APPLICATIONS

This application claims the benefit of U.S. Provisional Patent Application No. 62/516,175 filed on Jun. 7, 2017 which is incorporated by reference in its entirety.

TECHNICAL FIELD

This application relates generally to fee-based document processing operations such as printing. The application relates more particularly to user allocation of document processing charges among multiple charge accounts.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Given the expense in obtaining and maintain MFPs, devices are frequently shared or monitored by users or technicians via a data network. MFPs, while moveable, are generally maintained in a fixed location. Until more recent times, users, which may include individuals or groups such as employees, administrators or technicians administrators of networked MFPs, were also generally in relatively fixed location. A user would typically communicate documents or other information from his or her office or workstation to a selected MFP. An administrator or technician would also monitor MFPs from a workstation.

Users may send document processing jobs, such as a print request, to one or more networked devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. If multiple users send their requests to the same device, the jobs are queued and outputted sequentially.

Many document processing operations may require a fee. All operations are associated with costs. All document operations require user access to, and operational time of, a device that can be expensive and further possesses a finite lifetime with regular device maintenance costs. All device operations consume electric power. While some operations, like faxing, e-mailing or scanning, do have costs associated with them, they are relatively small as compared to printing. Printing operations require mechanical interactions that place wear and tear on paper drive mechanisms and imaging mechanism. Printing operations may consume substantially more power, particularly when heat fusing of toner is utilized. Printing operations also require consumption media, such as paper, and deposition components, such as ink or toner. Color printing can be even more expensive as it requires formation of colors by consumption of multiple colors of toner or ink.

For the reasons noted above, many MFPs are subject to a use charge. Operations such as scanning, emailing or faxing may be offered at low or no cost. The more expensive printing or copying may be subject to a fee, such as per-page fee. Color printing or copying may be subject to a higher charge. In some situations, a user may pay their document processing fee directly on an MFP. Brick and mortar printing business such as, FedEx Office, The UPS Store or Staples may have MFPs that a user can use to make fee-based copies or printouts. Payment can be made directly on a machine or via a networked pay terminal.

SUMMARY

In accordance with an example embodiment of the subject application, a system and method for multiple account document processing cost accounting includes a multifunction peripheral including an intelligent controller having a processor and memory. A document processing engine operates in conjunction with an instructions issued from the controller. The intelligent controller receives into memory document processing job data associated with a user. A user interface receives user input identifying the user. The processor calculates a cost for completing a document processing operation with the document processing job data and the calculated cost is displayed. The processor identifies cost centers associated with an identified user and displays indicia identifying them, along with their associated account values. The processor receives a user selection identifying a selected cost center and completes a document processing operation using the job data and debits an account value of the selected cost center.

BRIEF DESCRIPTION OF THE DRAWINGS

Various embodiments will become better understood with regard to the following description, appended claims and accompanying drawings wherein:

DETAILED DESCRIPTION

Figure 1:
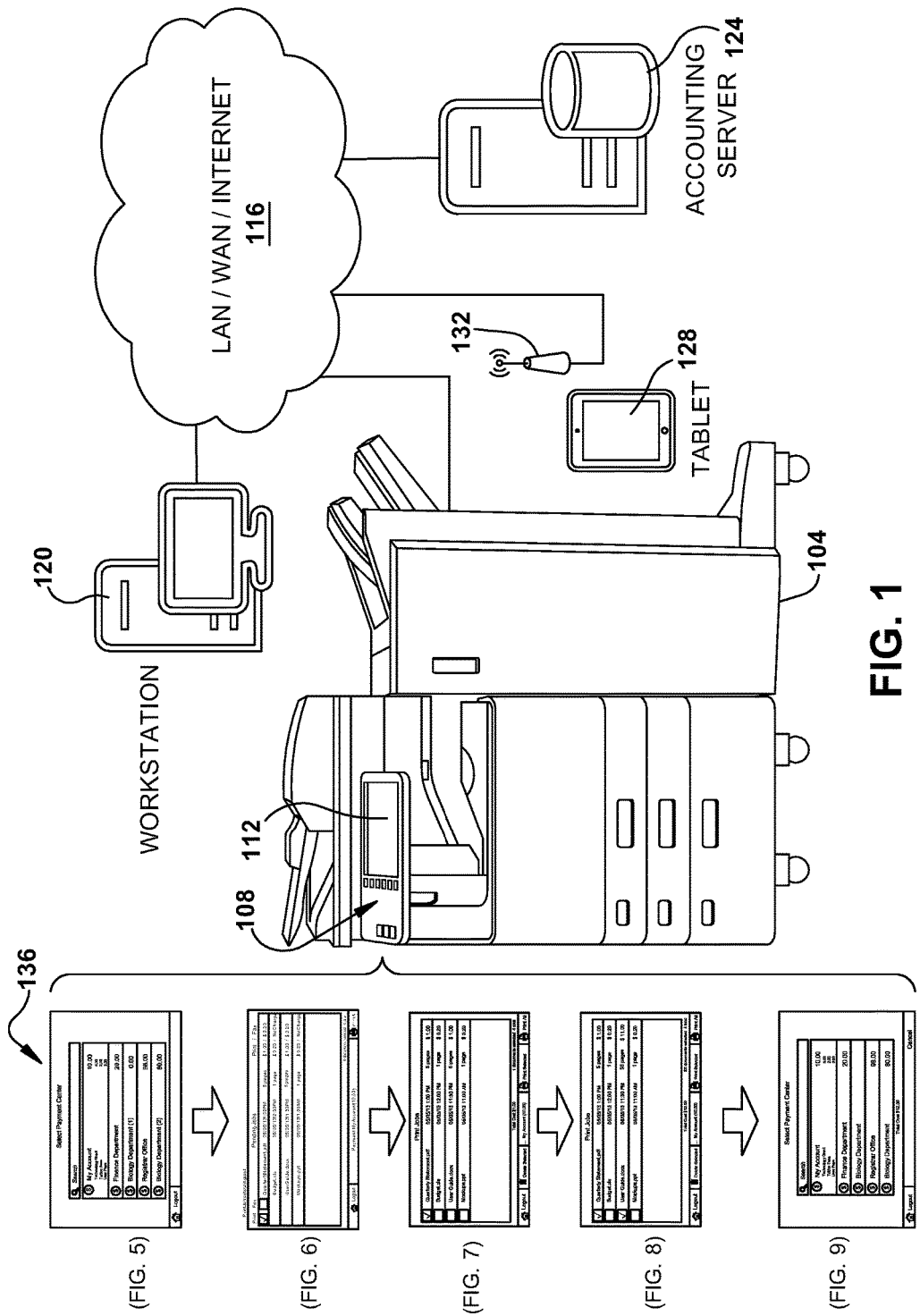
FIG. 1 is an example embodiment of a multiple account document processing accounting system.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Fee based document processing operations on devices such as MFPs may be implemented in situations other than brick-and-mortar shops such as noted above. Schools may have a mechanism to charge students for document processing. Payment can be made directly, as noted above. Alternatively, a student may have a page allotment, such as a fixed number of pages or a fixed dollar amount for use per month, per quarter or per semester. In another example, a student may make an advance deposit and secure a credit for future document processing needs. A deposit may also be used to provide additional printouts, for example, if they have used up their allotment.

In another example employees may be giving document allotments, such as a preset dollar value per month. In a corporate environment, a user may need to identify an account against which their document processing fees are to be assessed. A shared account may be used by a group of employees with a shared value to use.

In an example user-device interaction commensurate with the forgoing, a user would walk up to an MFP and login with their user credentials, such as username and password or any other suitable authentication process. The user would then enter information to identify their charge account. Once identified, the user could complete their document processing operations provided sufficient funds or use quotas remain available to them. It could be problematic if a user enters an account that is, for example, near depletion. A job may be refused or only partially completed with their available account value. A user may have alternative accounts at their disposal. By way of further example, a teacher may have a charge account for student handouts, another charge account for school functions, another account for administrative duties and yet another account for personal projects. A particular job may be chargeable to two or more accounts, either in the alternative or in combination. A user may have multiple accounts that might be used, but be unaware as to which one is optimal for balancing their account values. In such an instance, a user may just pick one account and improperly charge all costs to it. A user may also just keep trying available accounts until one has sufficient funds to do the needed job. A user may have also queued multiple print jobs, for example, with each print job chargeable to a different account or combinations of accounts, rendering it difficult or impossible to assign a correct charge account for each job.

In accordance with the forgoing, the subject application teaches example embodiments, detailed below, wherein a user logs in to and MFP device, to complete a document processing operation, either at the device itself or remotely. Once recognized, the identified user is then supplied with menus including a menu listing accounts available to them and corresponding account values, such as page counts or dollar values. Dollar values or credit values may be advantageous insofar as different documents processing operations can be charged at different rates. As used herein, cost centers are comprised of any suitable account value. An account entry may also illustrate special rates or discounts associated with it. For example, a particular account may be with a client that has negotiated special rates. Such a client's account listing may indicate this by special indicia, such as showing their discount. In other situations, the account value may be adjusted relative to its special pricing so that the account would appear to have more value than it would otherwise show. A user is enabled to easily match one or more or jobs with one or more accounts.

In accordance with the subject application, FIG. 1 illustrates an example embodiment of a 100 that includes one or more MFPs, illustrated by way of example by MFP 104. MFP 104 includes a user interface 108 suitably comprised of touchscreen 112. MFP 104 is in network communication with network cloud 116, suitably comprised of any wireless or wired local area network (LAN) or a wide area network (WAN) which can comprise the Internet, or any suitable combination thereof. Also in network communication are one or more digital devices including, for example workstation 120, accounting server 124 or tablet computer 128, shown connected to network cloud 116 via access point 132. An interface display sequence 136 is suitably generated on touchscreen 112 and will be described in greater detail in connection with FIGS. 5-9, below.

Figure 2:
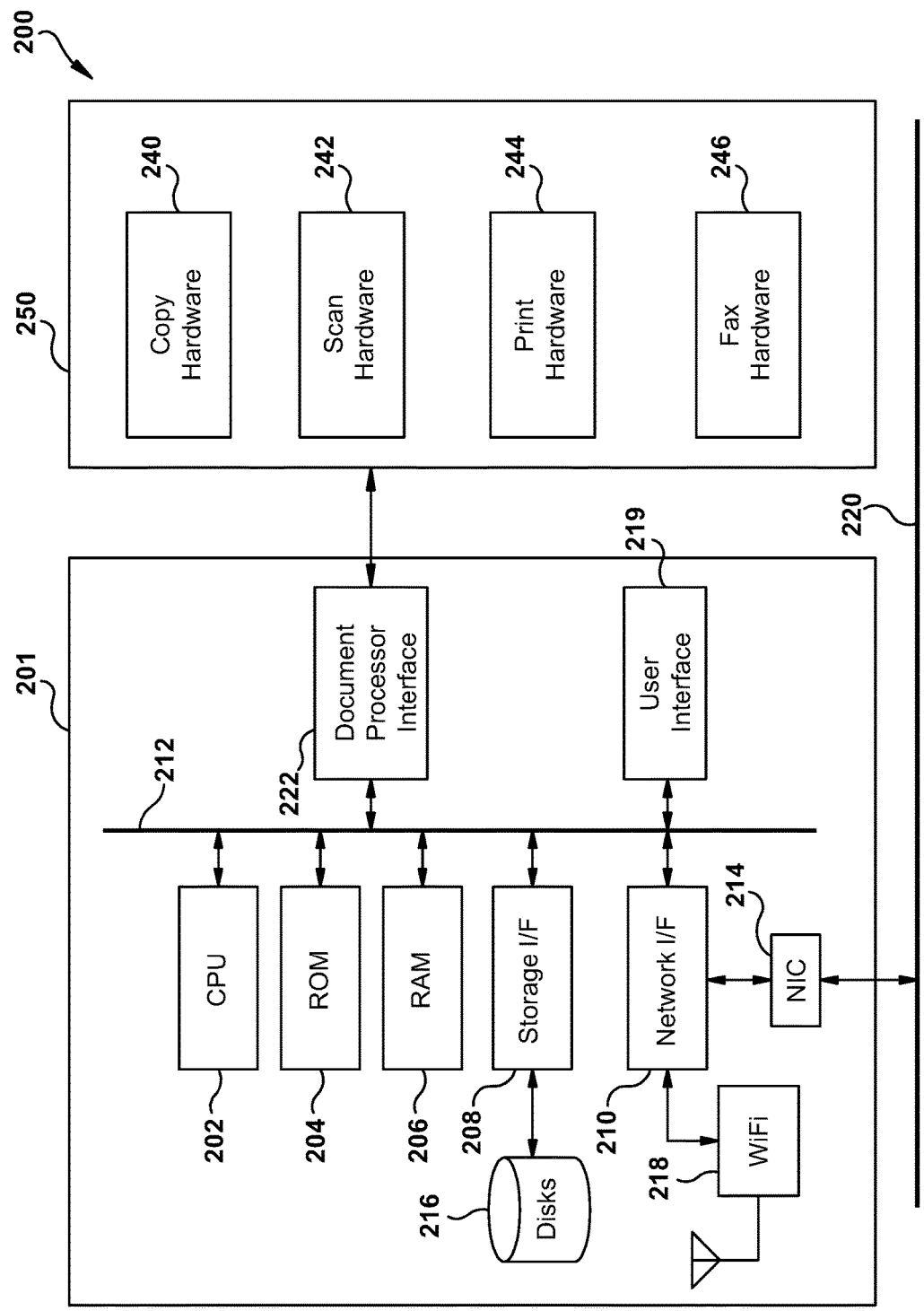
FIG. 2 is an example embodiment of a networked digital device.

Turning now to FIG. 2 illustrated is an example embodiment of a networked digital device comprised of a document rendering system 200 suitably comprised within an MFP, such as with MFP 104 of FIG. 1. Included in intelligent controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via wireless network interface 218. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightening, telephone line, or the like. Processor 202 is also in data communication with one or more sensors 219 which provide data relative to a state of the device or associated surroundings, such as device temperature, ambient temperature, humidity, device movement and the like.

Processor 202 can also be in data communication with any suitable user input/output (I/O) interface 219 which provides data communication with user peripherals, such as displays, keyboards, mice, track balls, touch screens, or the like. Hardware monitors suitably provides device event data, working in concert with suitable monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 216 of FIG. 2.

Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional hardware 250. It will be understood that functional units are suitably comprised of intelligent units, including any suitable hardware or software platform.

Intelligent controller 201 is suitably provided with an embedded web server system for device configuration and administration. A suitable web interface is comprised of TOPACCESS Controller (sometimes referred to in the subject illustrations as "TA"), available from Toshiba TEC Corporation.

Figure 3:
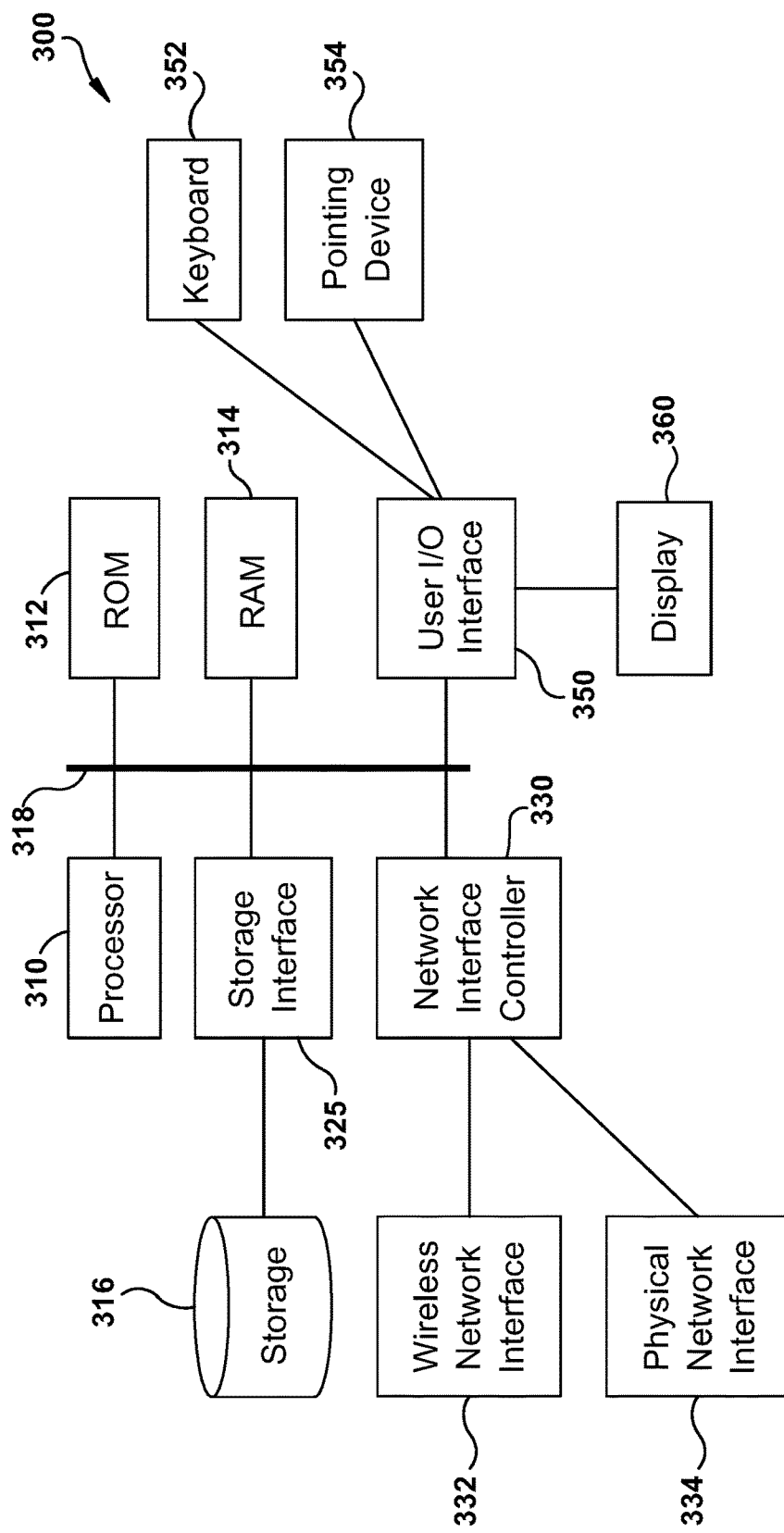
FIG. 3 is an example embodiment of a digital device.

Turning now to FIG. 3, illustrated is an example embodiment of a digital device 300 such as workstation 120, accounting server 124 or tablet 128, or any other suitable data device like a notebook computer, smartphone, and the like. Included are one or more processors, such as that illustrated by processor 310. Each processor is suitably associated with non-volatile memory, such as read only memory (ROM) 312 and random access memory (RAM) 314, via a data bus 318.

Processor 310 is also in data communication with a storage interface 325 for reading or writing to a data storage system 316, suitably comprised of a hard disk, optical disk, solid-state disk, or any other suitable data storage as will be appreciated by one of ordinary skill in the art.

Processor 310 is also in data communication with a network interface controller (NIC) 330, which provides a data path to any suitable wired or physical network connection via physical network interface 334, or to any suitable wireless data connection via wireless network interface 332, such as one or more of the networks detailed above. The system suitably uses location based services. By way of example, if multiple error event management systems are used, it may be advantageous to have monitoring of devices completed by a local or more proximate event management system.

Processor 304 is also in data communication with a user input/output (I/O) interface 350 which provides data communication with user peripherals, such as display 360, as well as keyboards 352, mice, track balls, or other pointing devices 354, touch screens, or the like. It will be understood that functional units are suitably comprised of intelligent units, including any suitable hardware or software platform.

Figure 4:
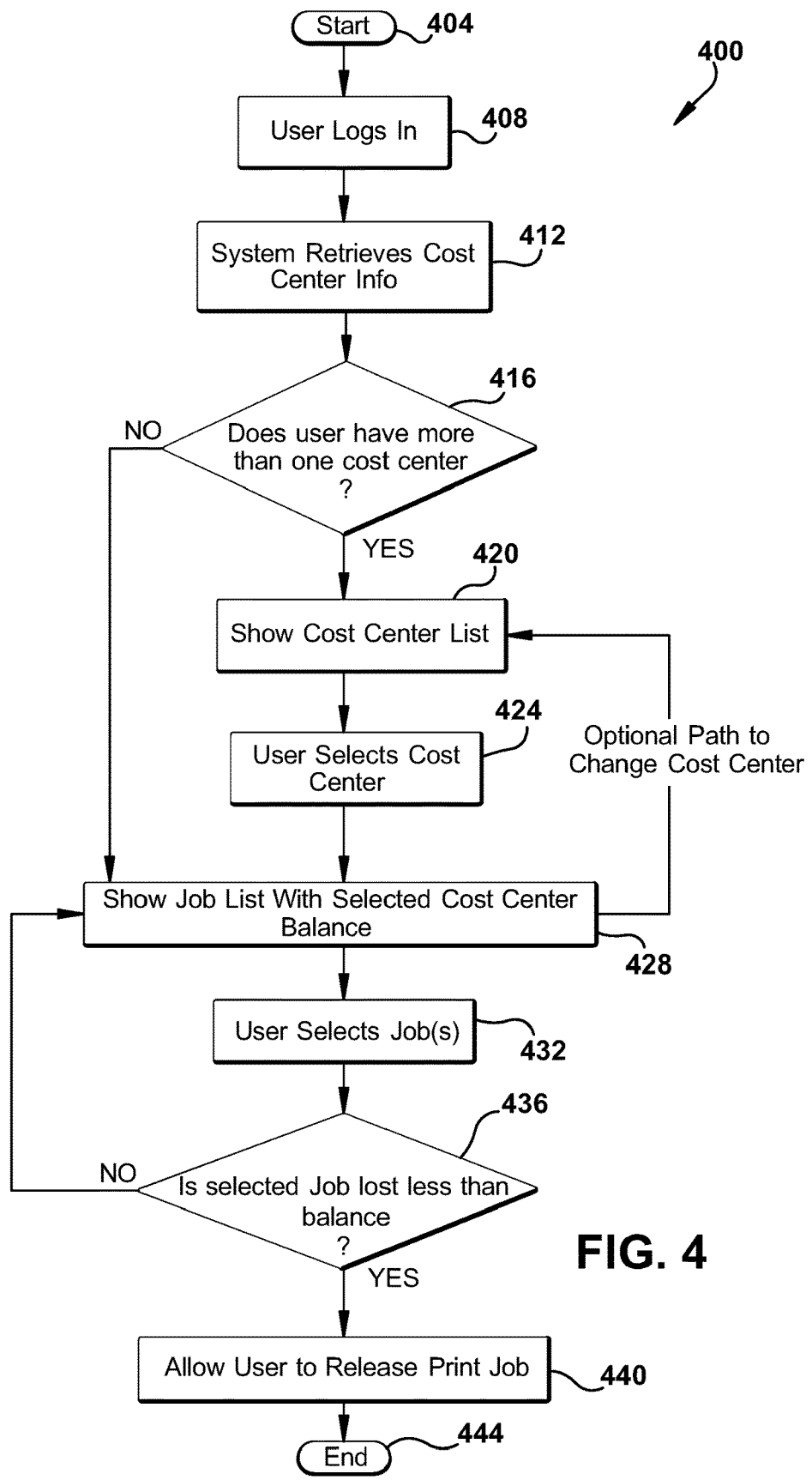
FIG. 4 is a flowchart of example operations of a flowchart for a multiple account document processing cost accounting system.

FIG. 4 is a flowchart 400 for a multiple account document processing accounting system. The process commences at block 404 and proceeds to user login at block 408. Login is suitably on a device itself, such as via user interface 108 of MFP 104 in FIG. 1, or remotely, such as via workstation 120 or tablet 128. Next, at block 412, the system retrieves cost center information for cost centers associated with the user identified at login. Cost center information is suitably stored locally on an MFP, such as MFP 104 of FIG. 1, or via a networked device, such as accounting server 124. A test is made at block 416 to determine if the logged in user has more than one associated cost center. If so, their list is displayed at block 420 and the user selects cost centers at block 424. Next, a job list for document processing jobs associated with the logged in user is shown, suitably along with indicia noting associated cost center balances at block 428. If a determination is made at block 416 that the logged in user has only one associated cost center, no selection is required and the process proceeds directly to block 428 for display relative to that single cost center.

Next, at block 432, the user selects one or more jobs for processing relative to one or more cost centers previously selected at block 424. Apportionment of jobs, or portions of jobs, relative to multiple, selected cost centers is also suitably accomplished at block 432. Next, a determination is made at block 436 as to whether sufficient cost center balances are present to accommodate the logged in user's selected cost centers. If so, their job or jobs are release at block 440, and the process terminates at block 444. Otherwise, the user's cost center balances are insufficient, then processing returns to block 428 to display the job list and the user can optionally change cost centers at block 420.

Figure 5:
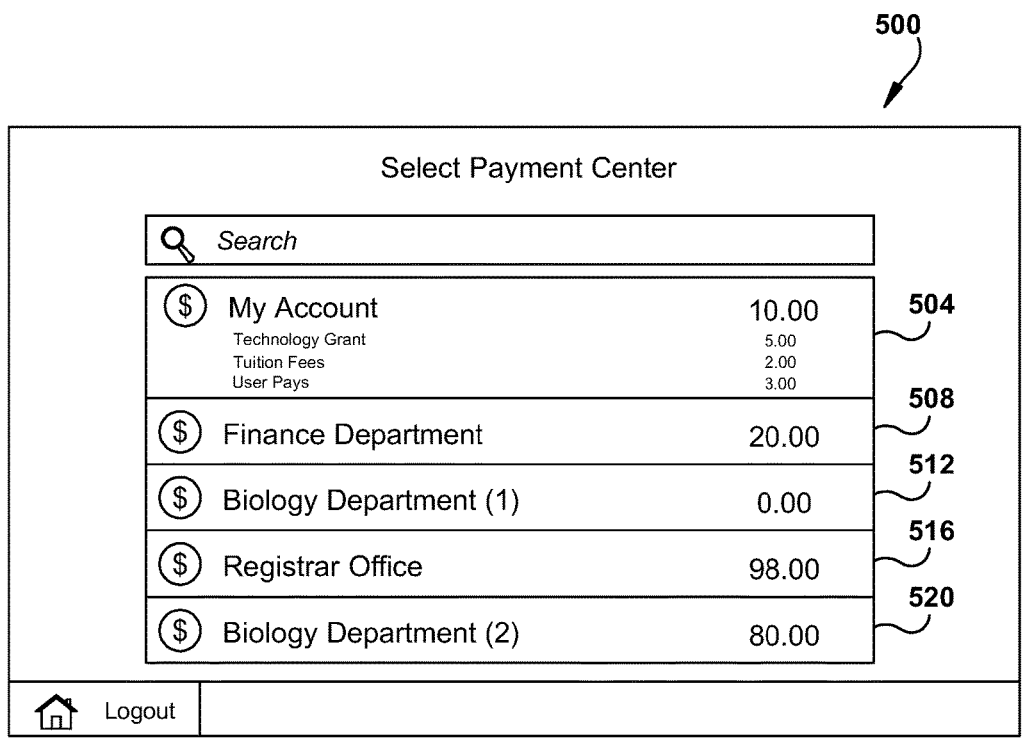
FIG. 5 is a first example embodiment of a user interface screen.

Next, FIGS. 5-9 illustrate example user interfaces, such as sequence 136 of FIG. 1. Referring first to FIG. 5, illustrated is example user interface 500 wherein a listing of multiple cost centers that are associated with a teacher is displayed. Block 504 illustrates a personal account associated with the teacher. Blocks 508, 512, 516 and 520 illustrate other accounts associated with the teacher, including cost centers for their finance department, a first biology department account, the registrar's office and a second biology department account, respectively. A user suitably selects one or more cost center, such as by touching the desired entry on a touchscreen.

Figure 6:
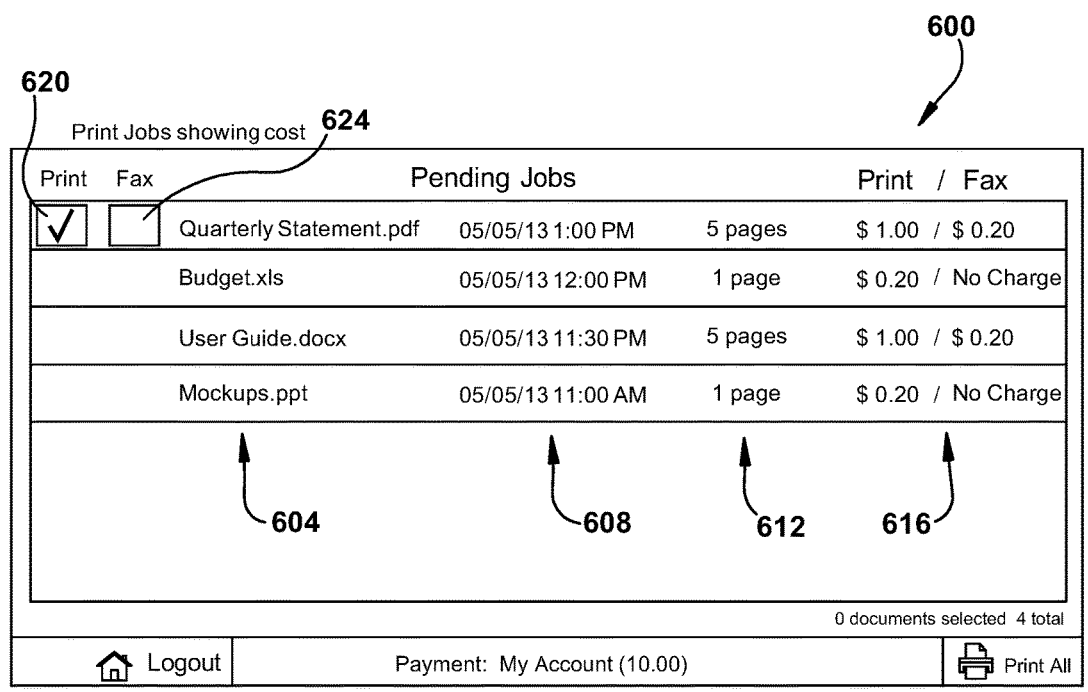
FIG. 6 is a second example embodiment of a user interface screen.

FIG. 6 illustrates an example user interface 600 wherein one or more jobs 604 associated with the user are displayed, suitably along with an associated time or date 608 when sent, along with an associated job size 612. Costs associated with document processing operations are displayed at 616. The user suitably selects printing at box 620 and/or faxing at block 624. In the illustrated example, only printing is selected.

Figure 7:
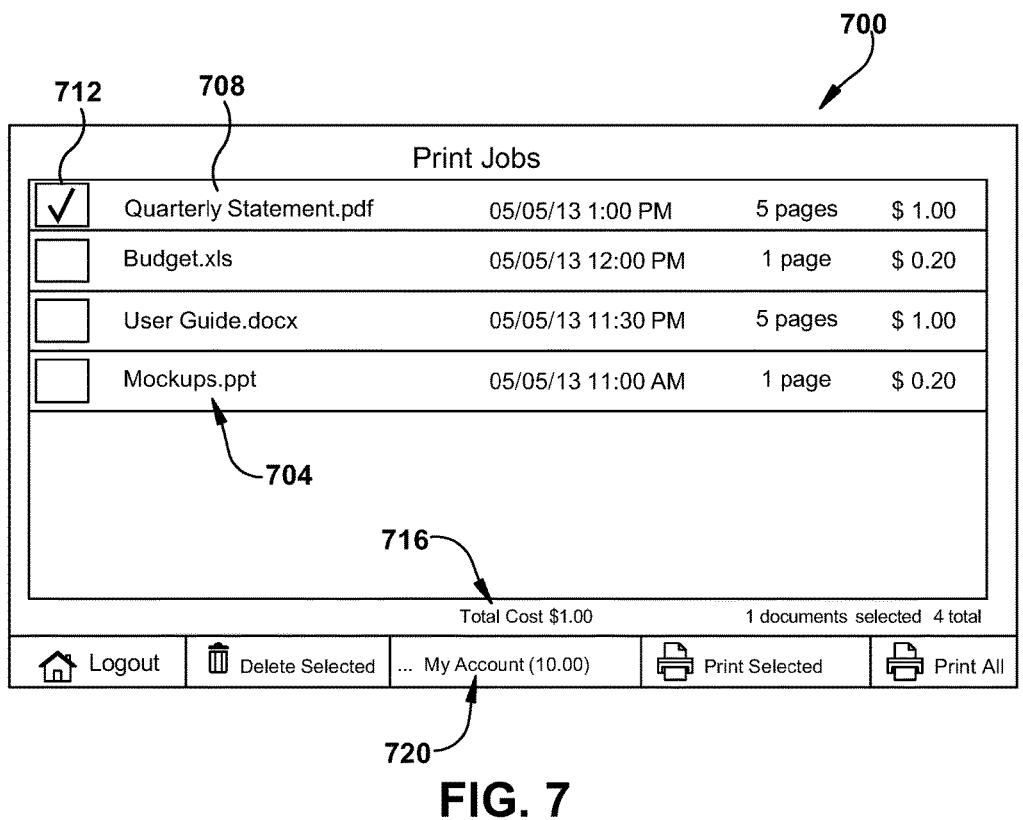
FIG. 7 is a third example embodiment of a user interface screen.

Referring next to FIG. 7, illustrated is an example user interface 700 such as might follow a user selection of printing in FIG. 6. The user's jobs are displayed at 704, and only printing options are displayed as no document was selected for faxing. In the illustrated example, an electronic document selection 708 comprising a PDF of a quarterly statement is selected via box 712 which causes a screen update to display a total cost for the selection at 716, along with a listing 720 showing a balance of one or more of the user's cost centers.

Figure 8:
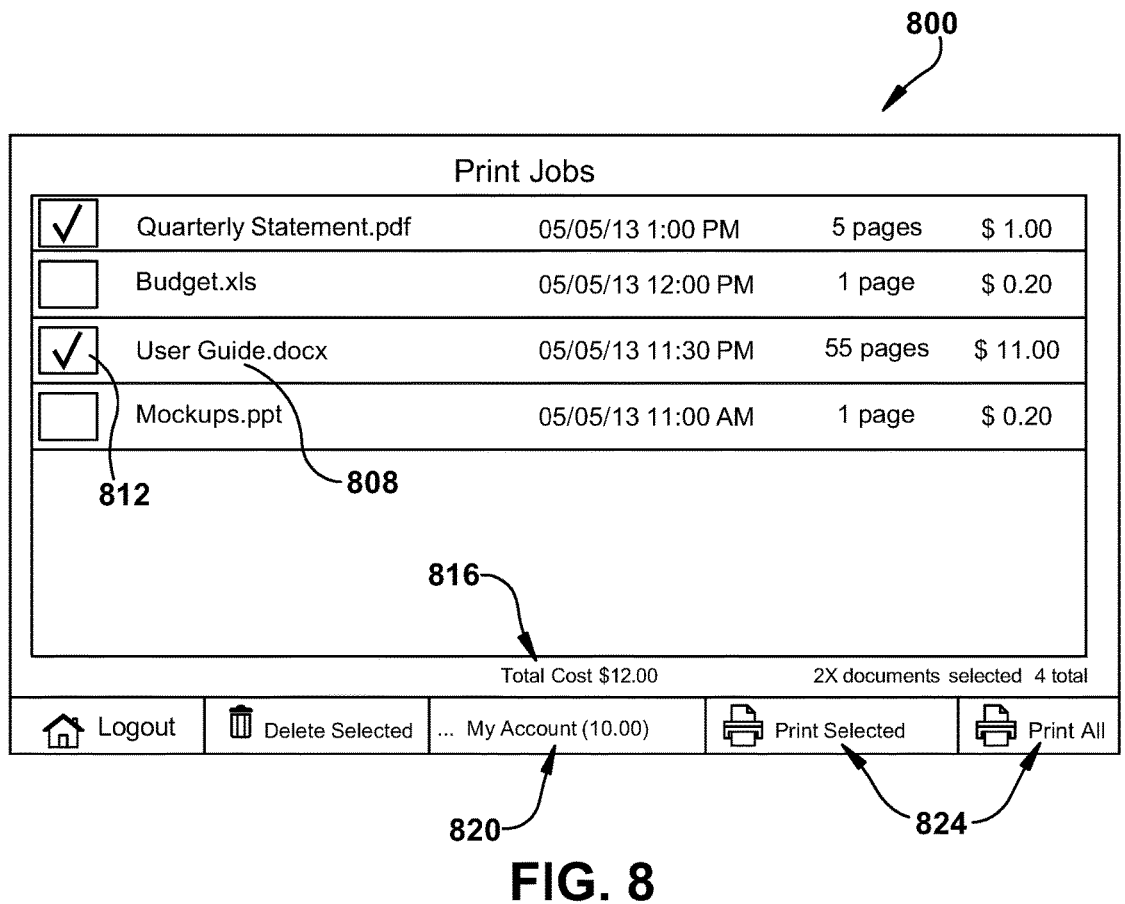
FIG. 8 is a fourth example embodiment of a user interface screen.

FIG. 8 illustrates an example user interface 800, following on FIG. 7, wherein the user selects a second document 808 by checking box 812. An updated, total cost 816 is displayed. User selection 824 allows a user to print selected documents or alternatively, print all documents, even if unchecked.

Figure 9:
FIG. 9 is a fifth example embodiment of a user interface screen.

FIG. 9 illustrates an example user interface 900 wherein the user's cost centers and associated values are displayed, along the total cost 904 associated with their selections. A selection of one account or multiple cost center accounts is suitably made. If multiple accounts are selected, the user is suitably inputs desired allocation, or apportioning, among their selections.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A multifunction peripheral comprising:
    an intelligent controller including a processor and memory;
    a document processing engine operable in conjunction with an instruction issued from the intelligent controller;

a network interface; and a user interface including a user input and a display, wherein the intelligent controller is configured to receive document processing job data associated with an user, wherein the memory is configured to store received document processing job data, wherein the user interface is configured to receive user input identifying the user, wherein the processor is configured to calculate a cost for completing a document processing operation with the document processing job data, wherein the processor is further configured to display a calculated cost on the display, wherein the processor is further configured to identify a plurality of cost centers associated with an identified user, wherein the processor is further configured to display indicia for each identified cost center on the display, wherein the processor is further configured to display account values associated with the identified user for each identified cost center on the display, wherein the processor is further configured to receive a user selection identifying a selected cost center of the plurality thereof, wherein the processor is further configured to complete the document processing operation with the document processing job data by enabling the document processing engine, and wherein the processor is further configured to commence a debit from the account value of the selected cost center.

2. The multifunction peripheral of claim 1 wherein the document processing engine is comprised of a print engine.

3. The multifunction peripheral of claim 1 wherein the processor is further configured to redisplay the cost center indicia and associated account values when an account value of the selected cost center is less than the calculated cost.

4. The multifunction peripheral of claim 3 wherein the processor is further configured to receive a second user selection identifying a second cost center in accordance with the redisplay.

5. The multifunction peripheral of claim 4 wherein the processor is further configured to apportion the calculated cost against the account values of both selected cost centers.

6. The multifunction peripheral of claim 3 wherein the redisplay of the cost center indicia and associated account values includes a display of a zeroed account value for the selected cost center.

7. The multifunction peripheral of claim 6 wherein the processor is further configured to calculate and display a remaining cost value as the calculated cost less an original value of the selected cost center.

8. A method comprising:

receiving document processing job data associated with a user;

storing received document processing job data;

receiving user input identifying the user via a user interface;

calculating, via a processor, a cost for completing a document processing operation with the document processing job data;

displaying a calculated cost on a display;

identifying a plurality of cost centers associated with the identified user;

displaying indicia for each identified cost center on the display;

displaying account values associated with the identified user for each identified cost center on the display;

receiving a user selection of a selected cost center from the identified cost centers;

completing the document processing operation with the document processing job data by enabling a document processing engine; and commencing a debit from the account value of the selected cost center.

9. The method of claim 8 wherein the document processing engine is comprised of a print engine.

10. The method of claim 8 further comprising redisplaying the cost center indicia and associated account values when an account value of the selected cost center is less than the calculated cost.

11. The method of claim 10 further comprising receiving a second user selection identifying a second cost center in accordance with the redisplay.

12. The method of claim 11 further comprising apportioning the calculated cost against the account values of both selected cost centers.

13. The method of claim 10 further comprising redisplaying the cost center indicia and associated account values inclusive of a display of a zeroed account value for the selected cost center.

14. The method of claim 13 further comprising calculating and displaying a remaining cost value as the calculated cost less an original value of the selected cost center.

15. A system comprising:

a processor and associated memory;

a network interface;

a data storage including
  data identifying a plurality of cost centers corresponding to each of a plurality of identified device users, and
  account data corresponding to an account value for each cost center corresponding to each user; and a user interface including a user input and a display, wherein the user interface is configured to receive user input identifying a user, wherein the processor is configured to calculate a print cost for completing a printing operation for a print job associated with an identified user, wherein the processor is further configured to display a calculated cost on the display, wherein the processor is further configured to identify a plurality of cost centers associated with the identified user, wherein the processor is further configured to display indicia for each identified cost center on the display, wherein the processor is further configured to display account values associated with the identified user for each identified cost center on the display, wherein the processor is further configured to receive a user selection identifying at least one selected cost center from the identified cost centers, wherein the processor is further configured to commence a document processing operation on the document processing job by an associated document processing engine, and wherein the processor is further configured to commence a debit from the account value of the at least one selected cost center.

16. The system of claim 15 wherein the data storage is associated with a networked file server accessible by the processor via the network interface.

17. The system of claim 15 wherein the user interface is associated with a networked data device accessible by the processor via the network interface.

18. The device of claim 15 wherein the processor is further configured to redisplay the cost center indicia and associated account values when an account value of the selected cost center is less than the calculated cost.

19. The device of claim 18 wherein the processor is further configured to receive a second user selection identifying a second cost center in accordance with the redisplay.

20. The device of claim 19 wherein the processor is further configured to apportion the calculated cost against the account values of both selected cost centers.

* * * * *